H. B. WALTER.
MULTIPLE STAPLING MACHINE.
APPLICATION FILED APR. 15, 1919.

1,418,853.

Patented June 6, 1922.
9 SHEETS—SHEET 1.

INVENTOR
Harrison B. Walter.

WITNESS

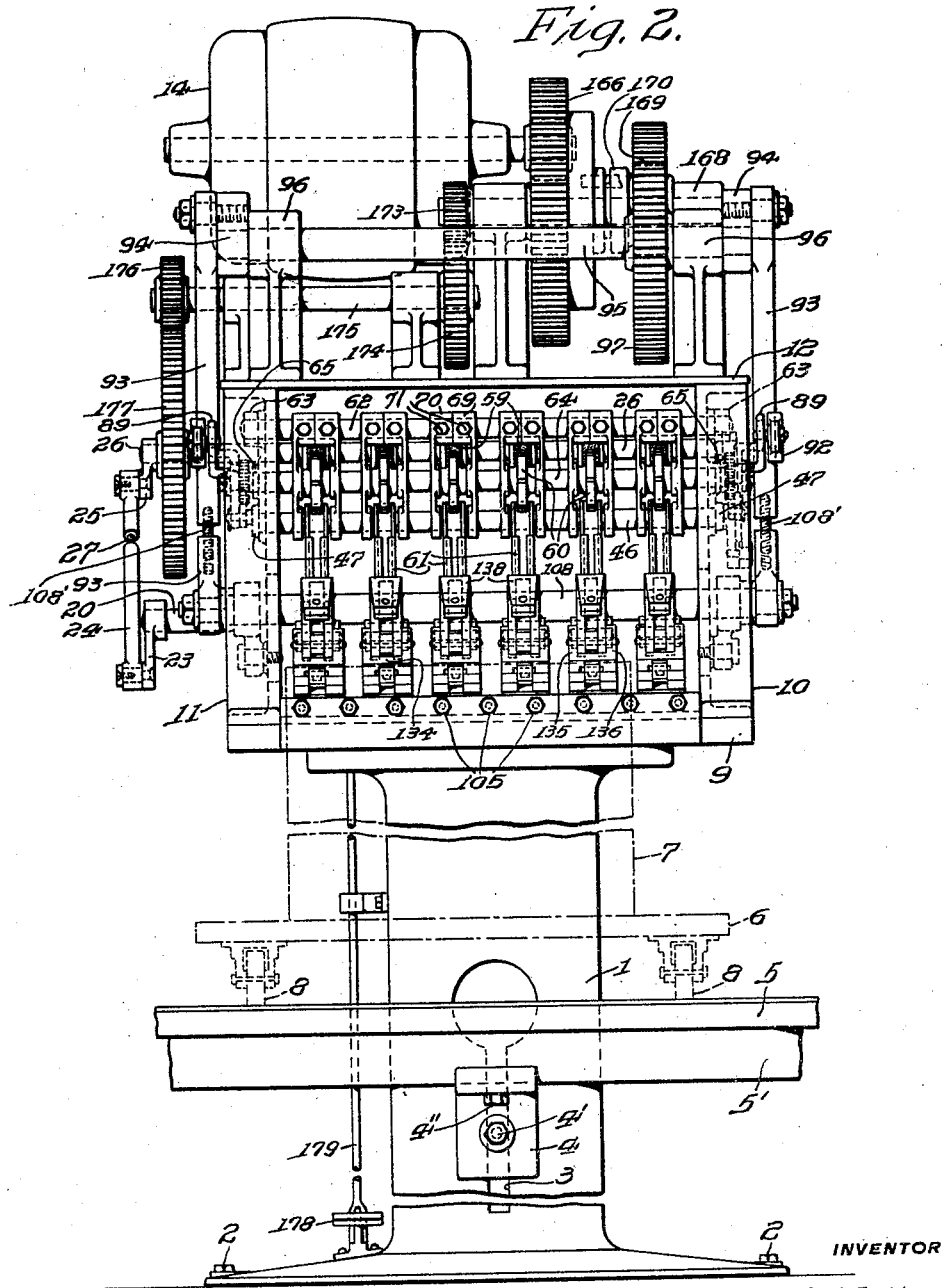

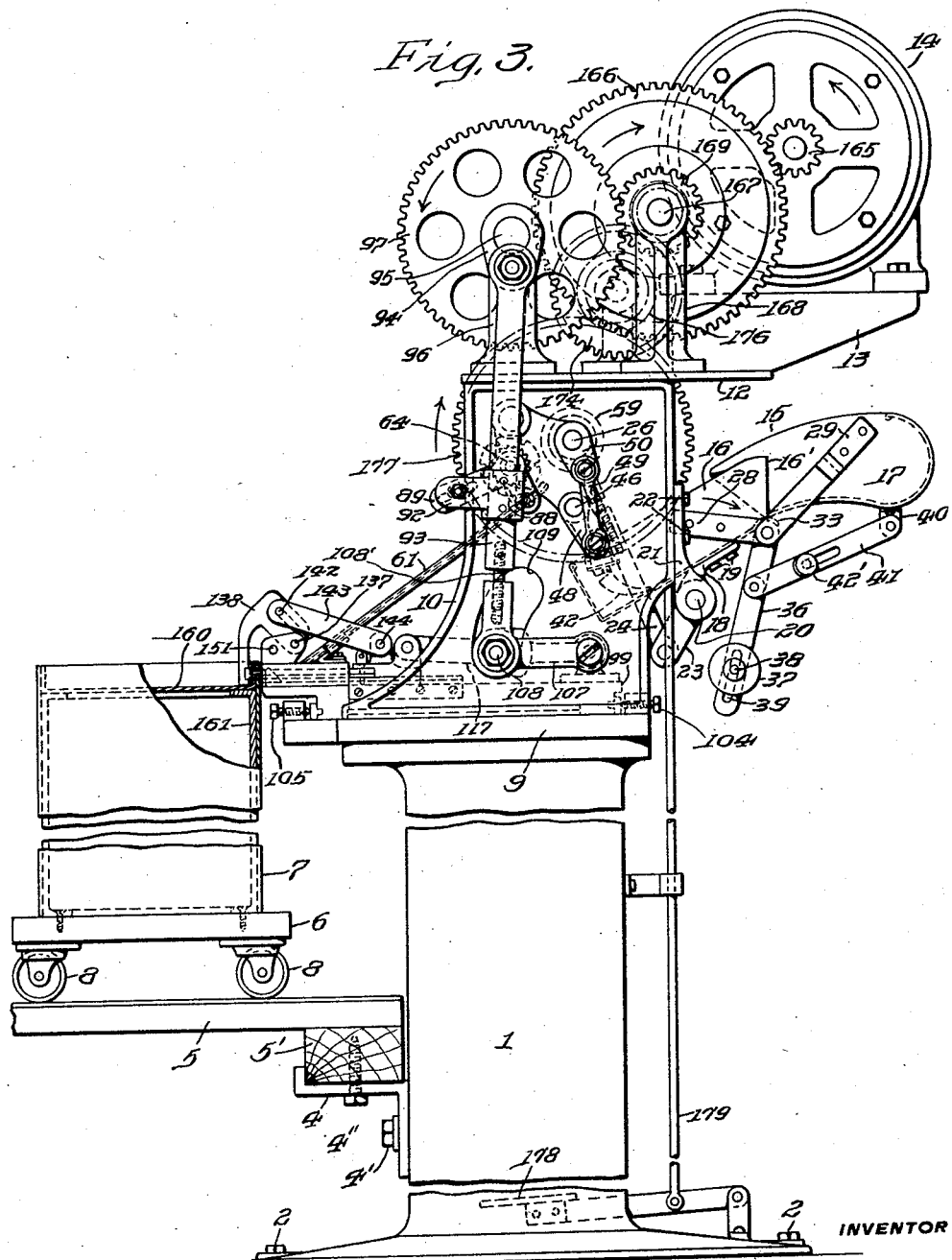

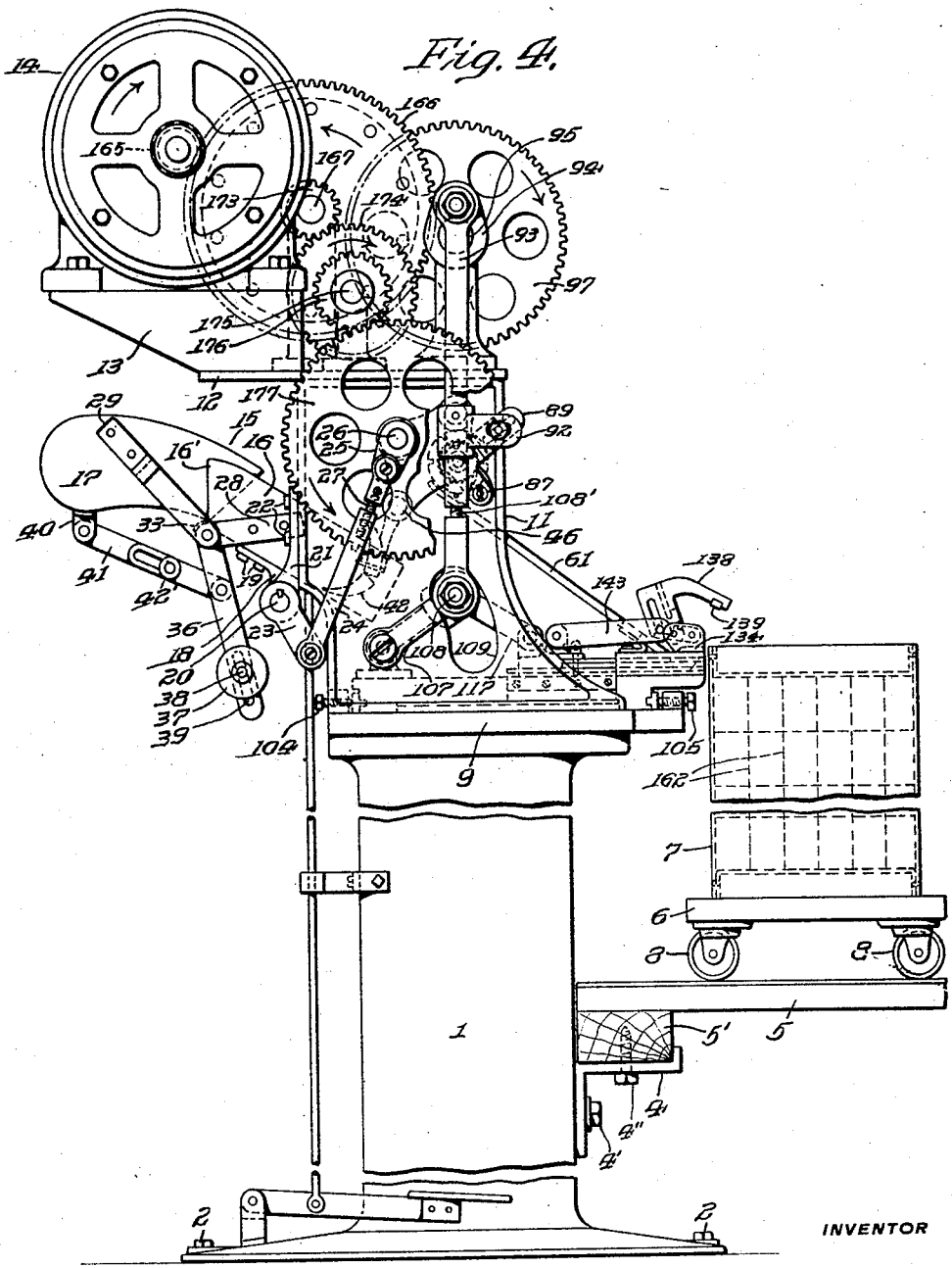

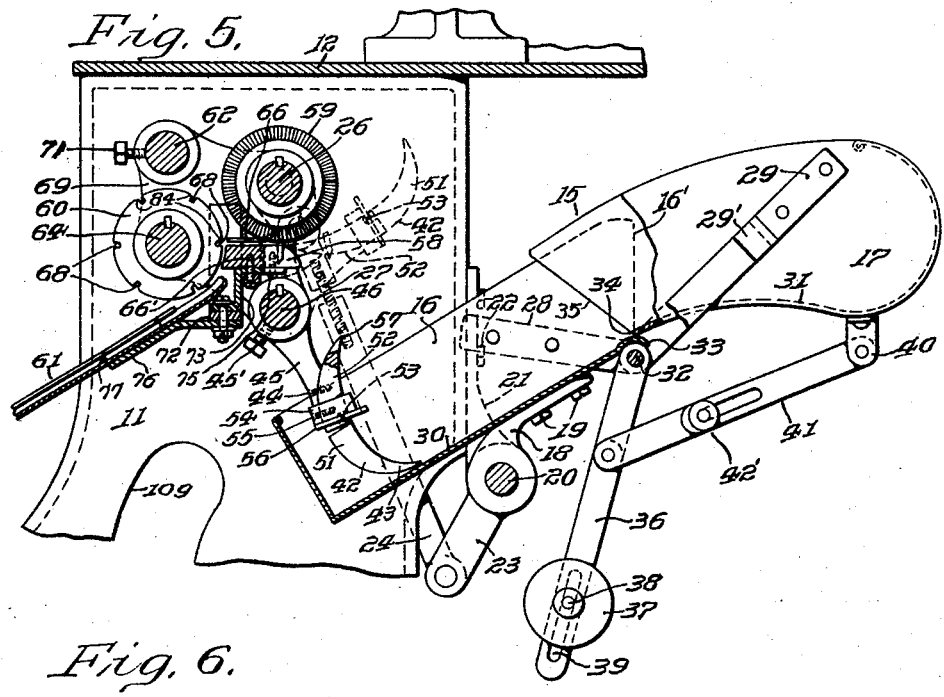

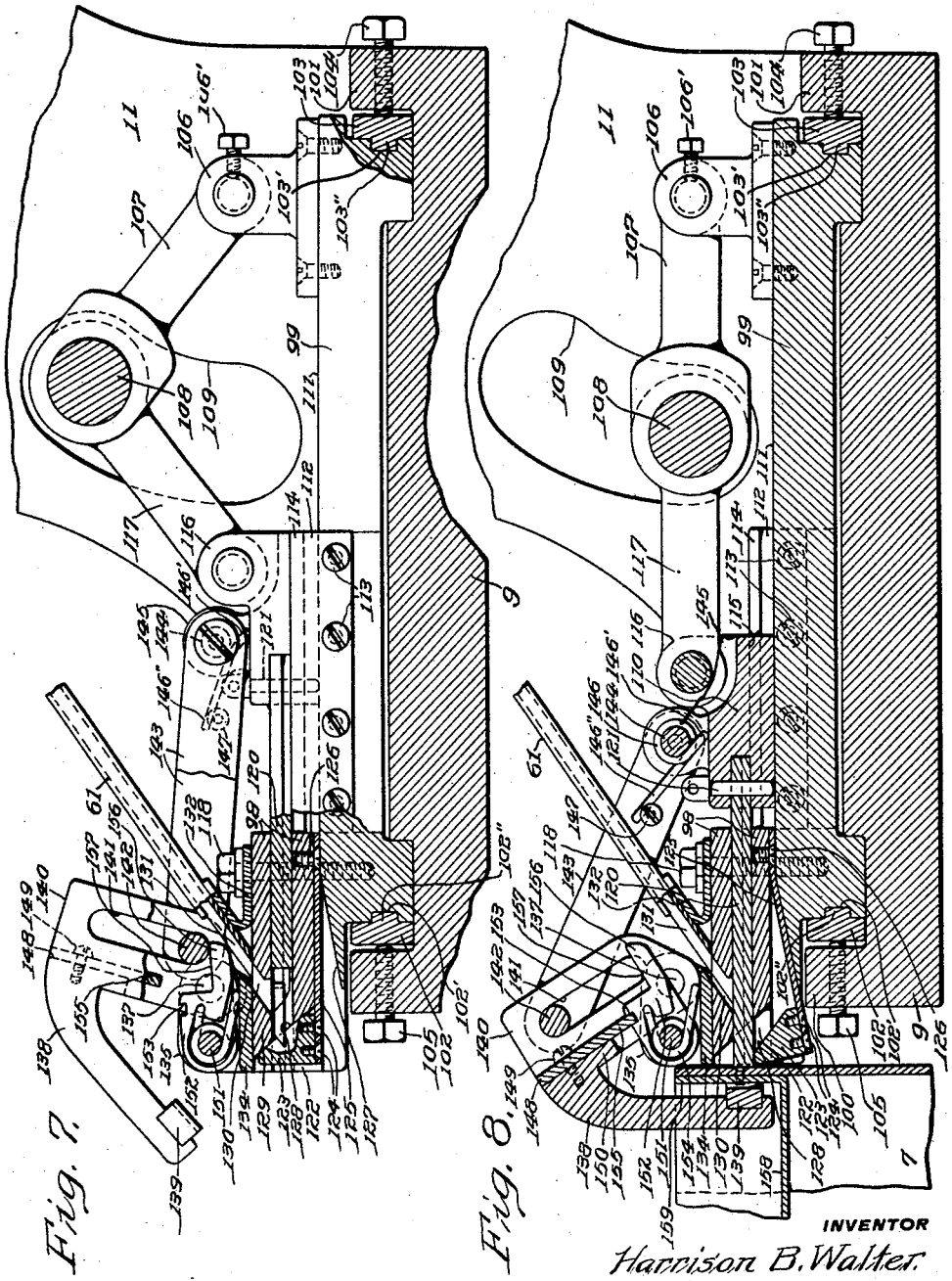

H. B. WALTER.
MULTIPLE STAPLING MACHINE.
APPLICATION FILED APR. 15, 1919.
1,418,853.
Patented June 6, 1922.
9 SHEETS—SHEET 7.
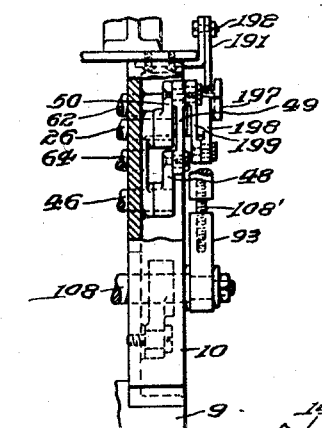
Fig. 12.
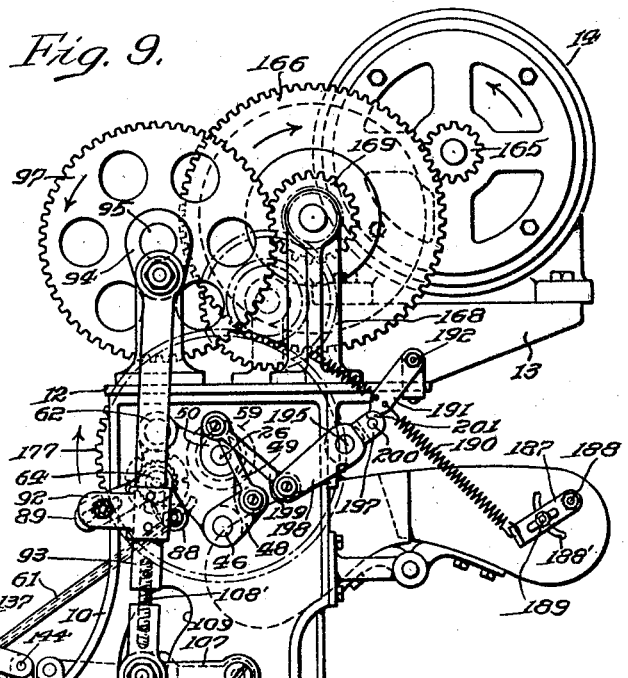
Fig. 9.
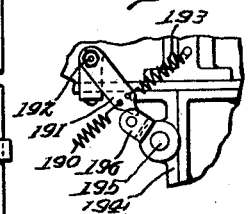
Fig. 13.
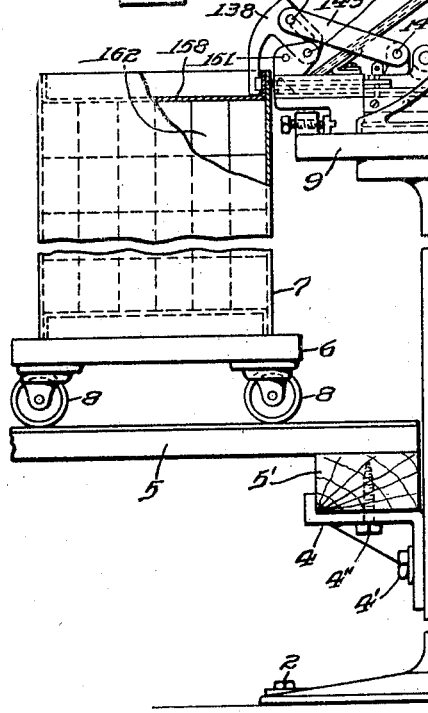
INVENTOR
Harrison B. Walter.
WITNESS
F. J. Hartman.
BY
Blount & Moulton,
ATTORNEYS

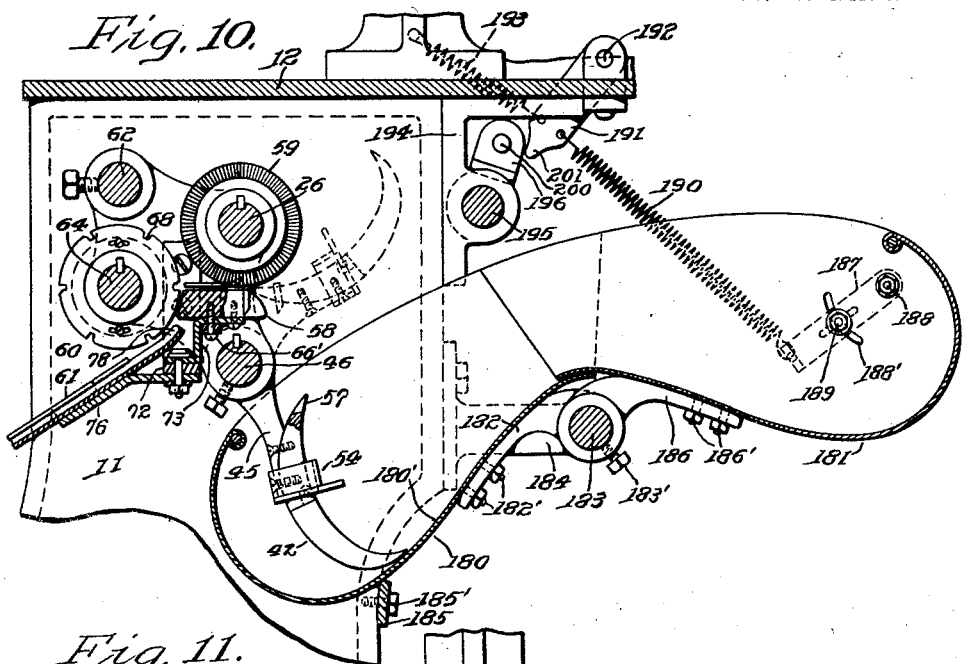

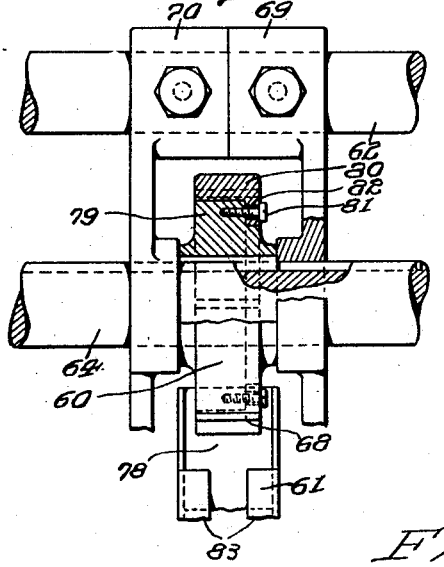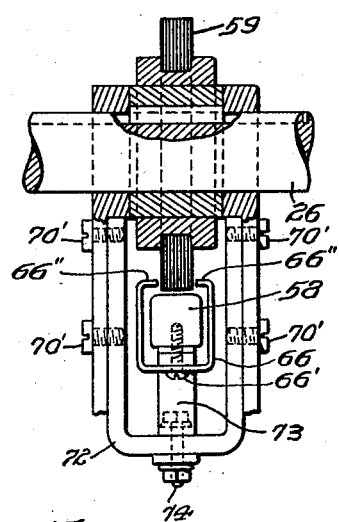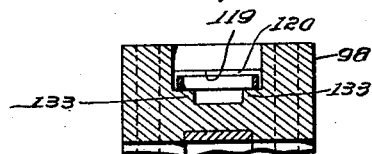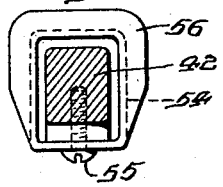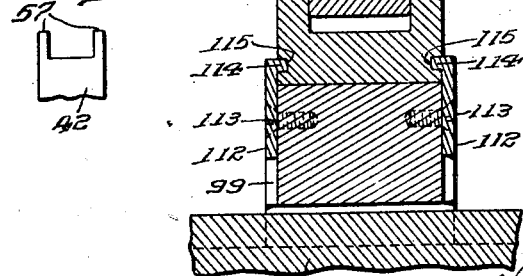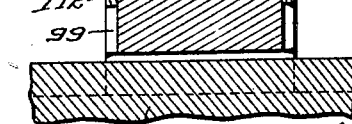

UNITED STATES PATENT OFFICE.

HARRISON B. WALTER, OF PHILADELPHIA, PENNSYLVANIA, ASSIGNOR TO FIBRE CONTAINER COMPANY, A CORPORATION OF PENNSYLVANIA.

MULTIPLE STAPLING MACHINE.

1,418,853.     Specification of Letters Patent.     Patented June 6, 1922.

Application filed April 15, 1919. Serial No. 290,155.

*To all whom it may concern:*

Be it known that I, HARRISON B. WALTER, a citizen of the United States, and a resident of Philadelphia, county of Philadelphia, State of Pennsylvania, have invented certain new and useful Improvements in Multiple Stapling Machines, of which the following is a specification, reference being had to the accompanying drawing, forming a part hereof.

The invention relates to a stapling machine of the multiple type wherein any number of a plurality of staples may be simultaneously driven through and clinched about the parts to be secured together by such staples.

One of the objects of the present invention is to provide a machine which is adapted to use previously made staples and to separate, feed, drive and clinch them in multiple by the automatic means hereinafter more specifically disclosed to attain the desired end.

Another object is to construct a machine with novel and useful means adapted to operate upon fibre shipping cases for the purpose of sealing the same into a sealed package without the use of any adhesive, tape or similar means of securement but by merely driving and clinching at properly spaced points a predetermined number of made staples for securing the parts of a casing together.

Another object is to provide the machine with a novel and useful common means for containing and for controlling the position of all of the made staples and from which means the staples for the several driving means may be separated as may be needed.

Another object is to provide the machine with a novel and useful means for selecting and properly positioning the separated staples in proper order to be successively operated upon by the feeding means.

Another object is to provide the machine with a novel and useful means for intermittently and successively feeding, in predetermined timed relation, the staples to each of the staple driving means.

A still further object is to provide the machine with a novel and useful means for forcibly driving and simultaneously clinching the fed staples at the points of securement in the fibre casing.

Such other useful and advantageous objects as flow from my invention will be disclosed by the following specification and illustrated in the accompanying drawing.

As aforesaid, the present invention relates to a machine for driving made staples in multiple rather than for driving staples made from an indefinite piece of wire strip stock from which staple pieces must first be cut and then shaped into the form of staples prior to their stapling function. By such arrangement a far less complicated machine is produced with less delicate and wearable parts as well as providing for a function of simultaneously driving any separated number of staples as against the driving of a single staple at a time as is only possible in the type of machine wherein the staple pieces are cut and shaped from stock prior to stapling. Another advantage is that in the present invention the machine is not limited to the use of any particular type or size of staple but that within a prescribed range a large variety of staples may be utilized without difficulty. A further advantage is also present in that the machine is flexible and unlimited as to the number of staples that may be driven at the same time and also that the distances between the points where the staples are driven may be varied in accordance with the conditions met with. Such a machine is therefore readily adapted for operations upon varying sizes of casings.

Where a machine is used with staples cut from stock the latter is usually supplied upon spools in small lots and of various sizes which must be kept in store, thereby occupying considerable space and there is also the disadvantage of caring for and returning the spools to the manufacturers when empty. In the present form of the invention, however, only so many of the staples that are needed may be ordered from a central station, where they may be suitably manufactured in indefinite quantities and placed in the hopper of the machine where they may remain until they are completely used, the hopper incidently acting as a means for storing the staples in the meanwhile and the staples being used only as the machine may be called upon to drive the staples.

Furthermore by reason of the simplicity of the machine a large number of staples may be driven at one time in closely spaced relation as against a more complicated machine provided with means for manufacturing the staples from stock and means making it impossible to bring the parts, particularly the driving parts, as close together as the making of the presently used boxes demand.

A practical embodiment of my invention is presented in the accompanying drawings in which—

Fig. 2 is a front elevation of the same;

Figs. 3 and 4 are side elevations of the machine on the opposite sides thereof;

Fig. 5 is a view in detail partly in section, of the means for storing, separating, arranging and feeding the staples with the parts shown in one position of operation;

Fig. 6 is a similar view of the same with the parts in another position of operation;

Fig. 7 is a view in detail partly in section of the drive and clinching means with the parts shown in one position of operation;

Fig. 8 is a similar view of the same with the parts in another position of operation;

Fig. 9 is a view in side elevation of the machine provided with a modified form of staple storing and separating means;

Fig. 10 is a view in detail partly in section of the same with the parts shown in one position of operation;

Fig. 11 is a similar view of the same showing the parts in another position of operation;

Fig. 12 is a view in detail of the connections utilized for operating the modified structure shown in Figs. 9, 10 and 11.

Fig. 13 is a view in detail of part of the jolting means.

Figs. 14, 15, 16, 17, 18, 19 and 20 are views in detail partly in section for more clearly illustrating some of the parts.

Figure 1:
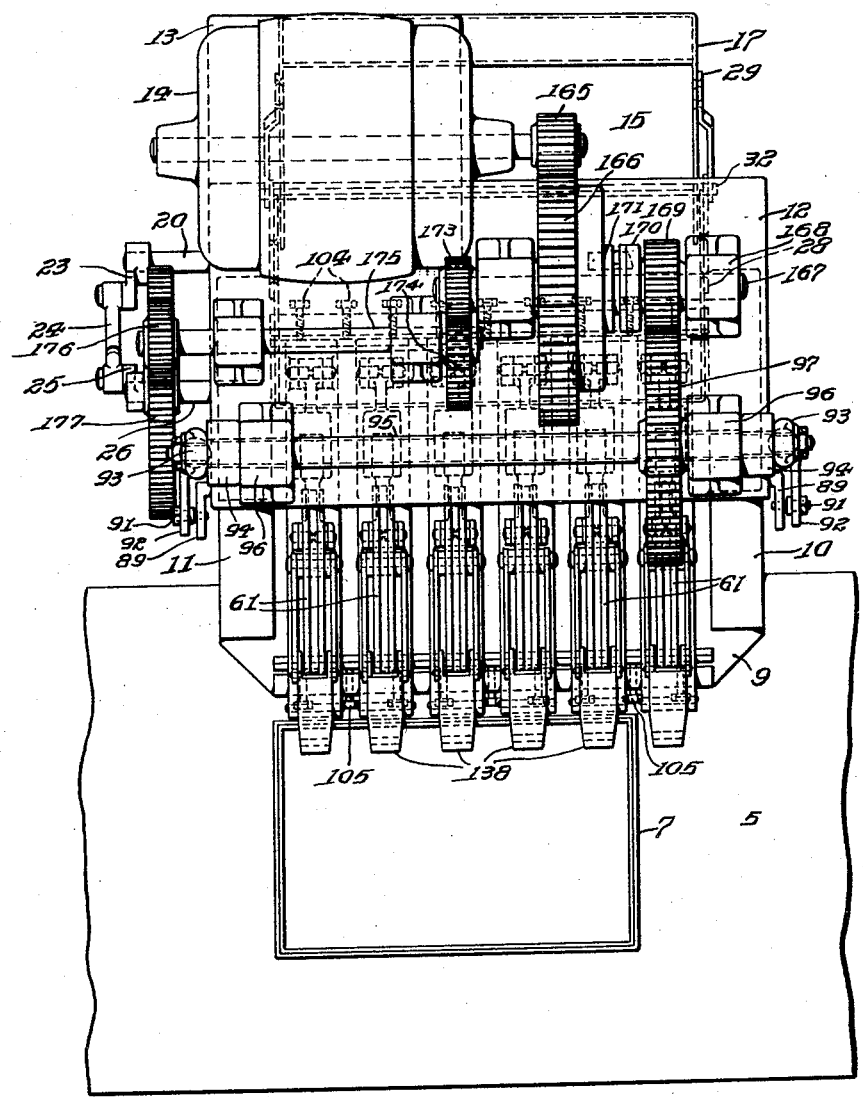
Fig. 1 is a top plan view of one form of machine embodying my invention.

Referring now more particularly to the drawing in which similar reference characters are used to designate corresponding parts in the several views, I have shown a multiple stapling machine comprising generally a hopper for containing made staples, a hook or separator for picking up a few staples from the mass contained in the hopper, feeding devices including rotary brushes and intermittently operated notched feed wheels for successively carrying staples to a chute or raceway in and down which the staples drop and slide to the chucks, driving plungers operating in the chucks to drive the staples through the sides of a fibre casing and the flanges of a head to be attached thereto, clinch blocks carried by supporting arms connected to the driving devices adapted to carry the blocks in place to receive and clinch the ends of the staples and a motor driven power transmission means, including gears and a clutch, for operating the mechanism.

*General.*

The machine is supported upon a pedestal 1 suitably secured in a stationary position to the floor by means of bolts 2. The front side of the pedestal is provided with a slot 3 in which may be adjustably clamped or otherwise suitably secured a bracket 4 by means of the bolt 4'. Upon this bracket may be suitably secured, as by lag screws 4", a cross-beam 5' upon which may be supported a table 5. Upon this table the trucks 6, adapted to carry the cartons or fibre casings 7, may be moved for the purpose of presenting the sides of the cartons to the stapling mechanism, the truck 6 being suitably provided with wheels 8 to facilitate the movement thereof.

The horizontal top of the pedestal is provided with a bed plate or deck bolster 9, which may be rigidly secured to the pedestal in any appropriate manner. From the deck bolster at the ends thereof rise the flanged walls or side frames 10 and 11 by and between which, taken in connection with the deck bolster 9, the stapling mechanism is generally supported. The side frames 10 and 11 are surmounted and connected by a base plate 12 for the motor driven transmission means. A shelf 13 rigidly secured to the base plate 12 is provided for supporting the motor 14 at a suitable elevation above the base plate 12.

*Hopper mechanism.*

The staple storing and containing means comprises a hopper 15 which extends for nearly the full width of the machine and which is composed of two parts or sections 16 and 17, the former of which is in the lower position (see Fig. 5) and is supported upon a pair of straps 18 rigidly secured to the bottom of the hopper section 16 by rivets or bolts 19 or other suitable connecting means, the straps 18 being also secured to the shaft 20 to turn therewith when the latter is angularly reciprocated as hereinafter more fully disclosed. The shaft 20 extends across or transversely of the rear of the machine and is rotatably supported in a horizontal position in the bearing straps 21 suitably attached by means of bolts 22 or the like to the rear of the side frames 10 and 11. At one end of the shaft 20 is rigidly secured a crank arm 23 to which is pivotally connected an end of a connecting rod 24, the other end of the connecting rod 24 being pivotally connected to the crank 25 rigidly secured to an end of the continuously and uniformly rotating brush shaft 26. The connecting rod is composed of two sections connected together by means of a threaded stem 27 by which the sections of the connecting rod may be adjusted relative to each other for the purpose of obtaining the proper length of the connecting rod for the desired operation of the hopper.

The pan or hopper section 16 is of generally rectangular form and is open at one end thereof for free communication with the interior of the section 17, the end of the latter being also open and adapted to project within the open end of the former in a sort of folding telescopic joint or connection, as is clearly shown in Figs. 5 and 6.

Both of the hopper sections 16 and 17 are respectively provided with metal straps 28 and 29 rigidly secured by rivets or the like to the side walls of the hopper section with the ends of the straps projecting below the bottoms 30 and 31 of said sections in the vicinity of the aforementioned folding telescopic joint between the two sections. The projecting ends of the straps 28 and 29 are provided with aligned apertures through which a hinge-shaft 32 may extend for the purpose of permitting the section 17 to move angularly with respect to the section 16 about the shaft 32 as an axis. The rear end of the bottom 30 of the hopper section 16 is provided with a curved projecting lip 33 concentric to the axis of the shaft 32 in order that the end 34 of the bottom 31 of the hopper section 17 will, at all times, be in close proximity to or in sliding contact with the bottom 30 during the relative angular movement between the sections 16 and 17 in order that no staples may escape through or clog the joint formed between said sections. It will also be noted that the side straps 29 secured to the hopper section 17 are also suitably offset at 29' to provide between the side walls of said section and said straps suitable spaces through which the ends 16' of the side walls of the hopper section 16 may pass without interference. The ends 35 of the side walls of the hopper section 17 are also cut at an inclination so that such ends will not interfere with the bottom 30 of the section 16 at one of the limits of the relative angular movement of the sections 16 and 17.

To the hinge shaft 32 and depending therefrom is pivotally connected to freely swing thereabout, a pendulous member 36 to the lower end of which may be adjustably secured on opposite sides thereof a pair of weights 37 by means of a tie bolt 38. The member 36 is also provided near its lower end with a slot 39 in which the bolt 38 is adapted to move for the purpose of adjusting the position thereof and the weights 37 relative to the member 36.

Near the rear end of the hopper section 17 and depending from the bottom 31 thereof is rigidly secured thereto a pivotal member 40, between which and the pendulous member 36 is pivotally connected a two-part connecting link 41, the latter being provided with a pin and slot adjustment connection 42' whereby the length of the connecting link may be varied as desired.

The hopper 15, in general, projects partly into the machine between the side frames 10 and 11 just below a plurality of separators 42 which are adapted to operate to select or extract and carry to predetermined points certain staples from the hopper section 16, as hereinafter more fully described.

The hopper 15 is constructed in the particular form described to enable the storing of a relatively large quantity of staples in the hopper section 17 and at the same time to so oscillate the two parts or sections so that a sufficient number of staples, yet not too many, may be delivered or otherwise caused to move over the inclined surface of the bottom 30 of the hopper section 16 toward the separating devices mentioned above.

By connecting the hopper section 16 to the crank 25 on the continuously rotating brush shaft, the section 16 receives an angular oscillation or reciprocation about the horizontal shaft 20 so as to oppositely incline the bottom 30 of the section 16 at angles slightly greater than the angle of repose so that the staples to be gathered upon the hooks 42 may slide without too great velocity or momentum down the surface of the bottom 30 and be caught or engaged over the ends 43 of the hooks 42, the relative position of the parts being shown in Fig. 5 of the drawing.

When the parts have moved, however, to the position shown in Fig. 6 of the drawing wherein the hooks 42 with engaged or straddled staples are in the position adjacent the feeding device, the hopper section 16, has been brought to a position where it is rearwardly inclined so that the staples that have failed to be separated by the hooks 42 have been slidably returned to the rear end of the pan or section 16 preparatory to their next movement forwardly toward the hooks 42 for the next separating function of said hooks.

As previously indicated, the hopper section 17 is hinged or pivotally connected to the section 16 whereby when the latter is oscillated or reciprocated the section 17 will move with it in a sort of arcuate path as well as relative thereto, and at the same time the section 17 is maintained normally level or in a substantially horizontal position by the counter-balancing device during its upward and downward movement with the section 16.

The counter-weight device comprising the pendulous member 36, the weights 37 and the link 41, is for the purpose of counter-balancing the hopper section 17 with its contained staples in order to maintain the same in such a position that a few of the staples will be able to slide or be delivered into the hopper section 16 and also that as the weight of the staples in section 17 gradually becomes accordingly lighter, the weights 37 and the pendulous member 36 will be adapted to descend in its counter-balancing effect on the section 17 and cause the latter to gradually rise or swing about the shaft 32 so as to deliver a few more staples to the hopper section 16 at a rate commensurate with the demand made by the machine. The link 41 is initially adjusted so as to properly relatively position the counter-balancing device and the hopper section 17 for the particular weight of the mass of staples first placed in the hopper section 17 and for the continuous feed of staples therefrom during the operation of the machine.

*Staple selecting and positioning means.*

For the purpose of selecting and transferring the staples to a position where they may be fed to the staple driving device, I have provided the machine with hooks 42 suitably secured by screws 44 to arms 45 keyed or otherwise fixed to a transverse shaft 46 to reciprocably rotate therewith. The ends of the shaft 46 extend through the side frames 10 and 11 and rotatably rest in bearings 47 provided on the outer faces of said frames, one of said ends of the shaft 46 protruding sufficiently to the exterior to rigidly receive an arm 48. The free end of the arm 48 has pivotally connected thereto a connecting link 49 while the other end of said link is pivotally connected to the free end of a crank 50 rigidly secured to an end of the continuously rotated brush shaft 26 upon the opposite end of which a crank 25, for oscillating the hopper 15, is secured as hereinbefore indicated.

Each of the hooks 42 may be of crescent shape and made into two sections 51 and 52 of which the former is rigidly secured to the arms 45 by means of screws 44 referred to above and the latter is pivotally connected to the former by the pivot 53 whereby the section 51 is adapted to freely ride in its downward movement, over the staples that may be present in the hopper section 16, without resulting in any jamming action between the hooks and the hopper as would occur if the hooks were single rigid members. Attention is called to the fact that when the section 51 is suddenly brought into contact with the bottom of the pan or any staples lying thereon a jarring action will occur which will cause a casting off of any staples remaining on said section. The hooks 42 are also so positioned that their ends 43 may merely contact with the bottom 30 of the hopper section 16 when the hooks 42 and the hopper section 16 are in their lowermost positions and at which time the staples are being delivered toward said hooks.

For the purpose of preventing entangled or imperfectly formed staples passing along the hooks 42 the latter are each surrounded by a trap member 54 which is of a size to provide between the inner walls of the same and the sides, as well as the active surface, of each hook, a space which merely permits the passage of a single properly formed staple, one at a time, but acts to prevent the passage of tangled staples or staples having others overriding the same or otherwise in abnormal condition.

These traps are adapted to be secured, as by screws 55 to the arms 48 as shown in Fig. 5. The forward ends of the traps 54 are also provided with the guard plates 56 for the purpose of further assuring the holding back of superfluous or irregular staples.

In operation the continual rotation of the brush shaft 26 with the crank 50 effects a reciprocation of the link 49 and arm 48 fixed to the shaft 46. The latter with the arms 48 and the hooks 42 receive an angular reciprocation about the axis of the shaft 46 from and to the positions of said hooks as shown in Figs. 5 and 6. The hooks 42 swing to the lower position during the swinging of the hopper section 16 to the position of causing the staples to move from the section 17 to the other end of the section 16, as best shown in Fig. 5, whereby, as the hooks are brought adjacent to or in contact with the bottom 30 of the section 16, certain of said staples will be able to straddle the hooks 42 and then as the hooks are raised these staples will be carried upwardly thereby. As the hooks 42 reach the higher position, as shown in dotted lines in Figs. 5 and 6, the upper surface of the hooks upon which the staples are supported will be brought to an inclination greater than the angle of repose so that the staples will slide along the same, passing through the trap 54 and dropping off the rear ends 57 of said hooks onto the support or bridge 58 along which the staples are moved as they straddle the same, by the engagement of the rotating brush 59 with the heads of said staples. The brushes may also facilitate the movement of the staples on the hooks 42 by engaging the lowermost staples straddling the lower ends of the hooks for the purpose of forcing said staples forward and onto the bridge 58. In the meanwhile the hopper section has been inclined rearwardly to the position best shown in Fig. 6.

In the downward movement of the hooks into the hopper section 16, if any staples happen to be in the path of any of such hooks, the latter will be able to "break joint" at the pivot 53 and the hook section 51 caused to freely ride over such staples to its lowermost position and as such hooks are again raised the ends 43 thereof will be adapted to project into the staple mass and to straighten out with the other hook section 52 as the staples are separated and raised. In this way the hooks will not crush or deform the staples and the free and full movement of the hooks 42 will not be obstructed.

*Feeding mechanism.*

For the purpose of receiving the staples successively from their positions where they have been gathered on the bridges 58 and to deliver each staple to the respective chucks in proper timed relation whereby the machine shall not become clogged, the latter may be provided with a feeding means which includes a set of rotating brushes 59 normally urging the lines of staples, straddling the bridges with the legs thereof extending downwardly and adjacent the vertical side faces thereof, forward to the notched feeding wheels 60 which intermittently separate and deliver staples in single multiple to their respective raceways 61.

The rotating brush shaft 26, as heretofore described, extends transversely of the machine and has its bearings in the side frames 10 and 11 with both ends of said shaft projecting beyond the same for securement thereto of the cranks 25 and 50. Adjacent to this shaft may be disposed a hanger shaft 62 in parallel relation to the brush shaft 26 and also extending transversely through the machine and supported in suitable bearings 63 formed on the side frames 10 and 11. Below the hanger shaft may be provided a feed shaft 64 also disposed in parallel relation to the shafts 26 and 62 as well as extending transversely of the machine and being supported in bearings 65 also formed on the side frames 10 and 11.

Beneath each brush 59 is located a bridge 58 upon which the staples are adapted to slide under the influence of the rotating brush 59, the peripheral surface of which contacts with the heads of the staples delivered to the bridge 58 by the hook 42 to urge the same longitudinally over the top surface of said bridge, with the legs of the staple depending adjacent the lateral faces of said bridge, toward the periphery of the feed wheel 60 for the purpose of causing the leading staple of a line of staples on said bridge to be engaged into one of the notches 68 presented opposite the rear end of said bridge. Surrounding each bridge and secured thereto at the lower portion thereof by means of a screw 66' or the like are the horizontal guard members 66 with the vertical sides and top portions thereof spaced at a distance from the side and top surfaces of the bridge about equal to the thickness of the legs and the head of the staples. This is for the purpose of maintaining the staples in single alignment and preventing any of the staples overriding the others in their movement along the bridge. The top wall 66" of this guard is provided with a longitudinal slot of a width considerably less than the length of a staple head but sufficient to permit the brushes to project therethrough in order that the bristles thereof may be adapted to engage with the heads of the staples in urging the same forward as mentioned above. The rear end of each bridge is located closely adjacent to the periphery of a feed wheel 60. Each of the feed wheels 60 is provided with short radial slots 68 in the edge thereof, with the depth of said slots 68 substantially equal to the width of the head of a staple so that as the feed wheel is caused to turn through a predetermined angle a slot 68 will be accurately presented opposite the line of staples, the leading staple upon the bridge 58 being adapted to move forward into said slot under the urging force of the brush 59.

The feed wheels may be composed of two sections 79 and 80 of which the latter overhangs the periphery of the former and is provided with the slots 68. Such assembly is of a thickness slightly less than the distance between the inside surfaces of the legs of the staple in order that the same may easily straddle the wheel 60 as the staple is forced into the notch 68 preparatory to its being fed to the raceway 61. These wheel sections may be secured together by screws 81 passing through arcuate slots 82 provided in the section 80 by which the sections 79 and 80 may be angularly relatively adjusted to each other for the purpose of presenting the slots 68 in exact alignment with the top surface of the bridges 58 during the intermittent rotation of said feed wheels.

The feed wheels 60 and the brushes 59 are respectively splined to the shafts 64 and 26 and are adapted to be adjustably moved along said shafts to be positioned in predetermined spaced relation with each other depending upon the distances apart the staples are to be driven. The brushes and the feed wheels are, therefore, accordingly located between the hanger members 69 and 70 which are adapted to slide longitudinally of the hanger shaft 62 and to be secured in any separated position thereon by the set screws 71. The hanger members therefore maintain the brushes and the feed wheels in proper spaced relation. At the same time the chuck bolsters, carrying the driving and clinching mechanism, the raceway, as well as the bridges and the hook devices are similarly spaced, the deck bolsters 9 being clamped into stationary position by the set screws 104 and 105 as hereinafter more fully described. The hooks 42 and arms 45 are suitably adjusted along the shaft 46 to accord with the other devices and are held in adjusted position by means of set screws 45' or the like.

Each of the hanger members 69 and 70 has suitably secured thereto, by screws 70', a leg of a U-shaped support 72 to which is rigidly secured a double angle bracket 73. This bracket is provided in its lower flange with a slot through which the securing bolt 74 may project to adjustably secure the bracket 73 to the support 72 in rigid location. The bridge 58 is supported upon the top flange of said bracket and is suitably secured thereto by means of screws 75 or the like. To the lower surface of each supporting strap 72 is also secured by the bolts 74 a bracket 76 the outwardly extending and inclined free end of which is provided with flanges 77 between which the raceway 61 is located and supported at its upper end to receive the staples from the feed wheel 60, the upper end 78 of each raceway being located at a point adjacent to the rear end of a bridge and the periphery of a feed wheel 60 for such purpose. It will be noted that the raceway is of generally rectangular cross section with overhanging flanges 83 on the upper side thereof, except at the upper end of the raceway, said flanges 83 operating as guards to maintain the staples within the raceway as they gravitate downwardly therein. It will be further noted that the trailing corners 84 of the slots 68 of the feed wheel are suitably curved or rounded so that in the event that a staple next adjacent the staple that has entered the slot 68 overhangs a portion of the slot, the rotation of the feed wheel will not be impeded or injury caused to such staple since the curved or rounded corner 84 will act as a cam surface to force back the overhanging staple on the bridge thereby permitting the periphery of the cam to clear the same as the notch having the staple therein carries the latter to the position where the staple is to be delivered to the raceway 61.

The intermittent motion of the feed wheel is timed in respect to the driving mechanism so as to revolve a certain part of its circumference past the end of the bridge 58 with each driving action of the staples, the angular advance of each feed wheel occurring subsequent to such driving function and preferably during the return movement of the driving means. As each of the feed wheels is so advanced a staple is thus carried from a point adjacent the end of the bridge 58 to a point above the upper end of the raceway where the staple will slide out of the slot 68 and drop by gravity in to said raceway and to then slide down said raceway by gravity into its respective driving chuck 98.

For the purpose of giving the feed wheel the requisite intermittent angular advance, depending upon the demand of the machine, the feed wheel shaft 64 is operatively connected at the ends thereof at the side of the frame members 10 and 11 with pawl and ratchet devices of which the ratchet 85 is rigidly secured to rotate with said shaft 64. The ends of the shaft 64 also project beyond said ratchets 85 and upon said projecting portions are mounted to freely rotate thereon the bell crank levers 86 each provided with arms 87 and 89 disposed substantially at right angles with each other. To the arm 87 is pivoted a pawl 88 the end of which is adapted to engage the teeth 85' of the ratchet 85. A suitable spring may be provided for normally urging said pawl into engagement with said teeth. The other arm 89 of the bell crank lever 86 is provided with an elongated slot through which projects a pin 91 adjustably secured in a slot 92' of a slotted feed clamp 92 rigidly attached to a vertically reciprocating thrust rod 93. This thrust rod is pivotally connected at its upper end to a crank 94 secured to rotate with shaft 95 mounted in the bearings 96 supported upon the base plate 12. This shaft carries a gear 97 which rotates as the gear is driven from a motor 14 through a suitable clutch in a manner hereinafter more fully described.

In operation the operator through suitable clutch means, throws the gear transmission into operation so as to cause a rotation of the gear 97 and the crank 94 whereby the thrust rod 93 is vertically reciprocated. Such movement is imparted to the clamp 92 and the pin 91, secured thereon, and to the slotted arm 89 of the bell crank lever 86. The bell crank lever is accordingly caused to rotatably oscillate about the shaft 64 causing the arm 87 to carry the pawl 88 operatively with the ratchet 85 thereby rotatably advancing the shaft 64 through a predetermined angle, the pin 91 being adjusted in the slot 92' to the position which gives the proper movement required to carry the slots 68, formed in the peripheries of the feed wheels 67, into register at the proper times with the paths of the staples upon the bridges 58. During all of this time each brush 59 is continuously rotating and, due to its contact with the heads of the staples straddling the bridges 58, constantly urges the line of staples on each bridge toward the periphery of their respective feed wheel 60 so that when a slot 68 is brought into register therewith the leading staple of said line of staples enters said slot where it remains until the feed wheel is again intermittently angularly rotated to carry the staple in said slot to a position immediately over the upper end of the respective raceway where the staple will be permitted to drop by gravity out of said slot with the points thereof foremost into said raceway. As each raceway is inclined at an angle slightly greater than the angle of repose the staple will be permitted to slide downwardly therein, with the points of said staple foremost, to the respective chuck 98 of the driving mechanism where the staple reaches a position in said chuck opposite the driving means prior to the driving function thereof.

*Staple driving and clinching mechanism.*

For the purpose of driving the staples, the machine may comprise a plurality of longitudinal chuck bolsters 99 horizontally arranged in spaced and parallel relation upon the deck bolster 9 referred to above. The deck bolster is provided at the rear and forward edges thereof with upstanding parallel flanges 100 and 101 extending transversely of the machine. Within these flanges are located gibs 102 and 103 respectively adjacent and parallel to the flanges 100 and 101, said gibs also extending transversely of the machine. The chuck bolsters referred to above are disposed between these gibs and are provided at their ends with guide slots 102' and 103' adapted to slidably fit over the tracks 102'' and 103'' formed upon said gibs. Both of the flanges 100 and 101 are provided with several set screws 104 and 105 which may be operated to bear against and laterally move the gibs for the purpose of tightly clamping the same against the ends of the chuck bolsters to thereby maintain said chuck bolsters fast. Accordingly when the screws 104 and 105 are loosened these chuck bolsters may be moved toward or from each other to space or locate the same as well as the parts carried thereby and connected thereto, in the spaced relation desired, preferably the distance apart equal to the distance from center to center of the points where the staples are to be driven and clinched. When so located the screws may be again tightened to hold said bolsters in such position.

Upon the top of each chuck bolster and at the rear end thereof is secured a stationary pivot post 106 suitably secured by its base to the respective bolster 99 by means of screws 106' or the like. Each of the pivot posts 106 has pivotally connected thereto a link 107, at an end thereof, the other end of the link being pivotally connected to a transverse thrust shaft 108 which extends through the slots 109 of the side frames 10 and 11. The vertically reciprocable rods 93 are connected at their lower ends to the respective ends of the thrust shaft 108 for the purpose of bodily raising and lowering said shaft with said thrust rods upon the rotation of the cranks 94 and the gear 97. The thrust rods are each composed of two sections connected together by means of a threaded stem 108' by which the sections of the thrust rods may be adjusted longitudinally relative to each other for the purpose of obtaining the proper length of the thrust rods for the desired operation of the drive and clinching mechanisms. Forwardly of the thrust shaft 108 and upon each chuck bolster 99 is located a sliding drive block 110 which is adapted to slide longitudinally upon the top surface 111 of the respective chuck bolster. Each of the blocks 110 in its forward and rearward reciprocation over the chuck bolster is suitably guided between guide plates 112 secured to the sides of the chuck bolster by means of screws 113 with the upper edges of the guides provided with lateral flanges 114 which fit into horizontal longitudinal slots 115 provided in the sides of the driver block 110. The rear end of the driver is provided at the upper side thereof with a pair of pivot wings 116 to which may be pivotally connected a link 117 with the other end of said link pivotally connected to the thrust shaft 108 hereinbefore referred to.

At the forward end of each chuck bolster 99 and forwardly of the driving block 110 is suitably secured the chuck 98, hereinbefore referred to, by means of bolts 118. Each chuck is provided with a T-shaped guide-way 119 for the operative reciprocation therethrough of the respective staple driver 120. The staple driver is also of T-shape cross section to slidably fit in said guide-way 119 and is secured at an end thereof by a pin 121 to the driving block 110 and is adapted to move with said block during the reciprocation thereof over the chuck bolster. The forward end of each chuck 98 is provided with a wedge shaped socket 122 in which is located a similarly shaped supporter member 123 secured by means of screws 124 to a flat steel spring member 125 at an end thereof. The other end of the spring member 125 may be attached to the lower surface of the chuck by means of the screws 126. The forward end of the chuck bolster 99 is tapered at 127 to form a recess in which the spring 125 with its connected supporter member 123 is adapted to move during the operation of the driver. The purpose of the supporter 123 is two-fold, the first of which is to act as an abutment and positioning means for the staple as it slides down the raceway into the chuck 98 and to prevent the staple from jumping forward and falling out of the chuck as the staple leaves the raceway and its other and more important function is to laterally brace the legs of the staple in the guide-way 119. For this purpose the supporter is interposed between the legs of the staple during the driving operation so as to maintain them in proper spaced relation during the clinching action in order that the legs of the staple will not tear laterally through the sides of the fibre casing or otherwise become buckled. The width of the supporter is accordingly slightly less than the internal distance between the legs of the staple. The supporter is so hung in the chuck 98 that as the staple is moved forwardly under the action of the driver 120, the supporter is adapted to gradually move downwardly to clear the head of the staple and to permit both the staple head and the driver 120 to pass over its top as the staple is being driven and clinched. For this purpose the supporter is provided with an inclined or sloping surface 128 against which the lower corner 129 of the driver is adapted to contact as the latter moves forwardly thus gradually forcing said supporter downwardly as the staple is being driven forward, the remaining upper portion of the supporter still being maintained between the legs of the staple yet to be driven into the casing, thereby maintaining the space between said legs at all times until the head of the staple passes over the top of the supporter.

Each of the chucks is further provided at the upper side thereof with an inclined opening 130 with which registers the lower end 131 of the raceway 61, the latter being suitably supported, by an angular bracket 132, in register with said opening. The bracket may be brazed to the raceway or otherwise appropriately secured thereto and is also held fast to the chuck by the bolt 118.

The guide-way provided within each chuck 98 is, as aforesaid, of T-shaped cross section thereby providing shoulders 133 upon which a staple may rest in a horizontal position, after its passage down the raceway 61, with its points directed forwardly and its head bridging said shoulders and lying adjacent the forward end of the driver 120.

For the puropse of clinching the staples as they are driven by the driver 120 the machine comprises several clinching devices, one each for each chuck 98. Each of the chucks 98 is, therefore, provided at its forward end with a channel member 134 suitably secured, as by brazing or otherwise, upon the top of the chuck. Said member 134 may comprise spaced upstanding ears or flanges 135 and 136, each provided with pivot perforations through the rear of which passes a hanger pivot 137, and through the others passes a latch pivot pin 151. The hanger 138 is substantially of an inverted V-shape with one of its legs, carrying a clinch block 139 near its end, projecting downwardly opposite the end of the driver and the other leg of which is in the form of a pair of rearwardly extending flanges 140 provided with bearing perforations at the lower end thereof fitting over the pivot 137 and adapted to turn or swing thereabout. Both of these flanges are provided with longitudinal slots 141 in which slides a cross pin 142 connected to the forward ends of a pair of hanger links 143. The rear ends of the hanger links are pivotally connected to the driver block 110 by means of the pivot 144 having a bearing in the member 145 forming a part of the driver block 110. Surrounding the pivot 144 is provided a coil spring 146 with its trailing or reactive end 146' bearing against the surface of the driver block 110 and its leading or active ends 146" secured to each of the hanger links 143 by means of screws 147 whereby the spring continually and normally urges the hanger links downwardly so as to carry the cross pin 142 to the bottom ends of the slots 141 for a purpose hereinafter more fully disclosed.

The hanger is provided between the slotted flanges 140 with a locking bar 148 secured to the solid portion of the hanger by means of a screw 149. The lower end of the locking bar projects beyond the web 150 transversely connecting the side flanges 140. Upon the pin 151 supported in the forward perforations of the upstanding ears 135 and 136, is pivotally supported a latch 152 adapted to coact with the lower end 155 of the locking bar as more fully stated below. The latch is provided with a notch 153 of a size sufficient to fit over the lower end 155 of the locking bar when in the position shown in Fig. 8. The latch may be laterally recessed to receive a coil spring 154 one end of which bears against the top of the chuck 98 and the other end of which projects into the side of the latch and normally operates to urge the latch upwardly angularly about the pin 151 to bring the notch 153 into engagement with the end 155 of the lock bar. The latch is also provided with a rearwardly extending projection 156 which, in the position shown in Fig. 8, has a surface 157 located a predetermined distance above the lower ends of the slots 141 in the flanges of the hanger when the parts are in the position shown in Fig. 8 but in contact with the pin 142 and depressed to points in line with the lower ends of the slots 141 when in the position shown in Fig. 7.

The structure described above refers to a clinching means carrying a clinching block 139 designed for use in stapling the heads of boxes known as "solid end" wherein the heads are flanged and recessed. In boxes of this character, the stapling device must provide for a placing of the clinching block inside of the head of the box. If the clinching blocks were fixed, it would be necessary in carrying out the clinching operation, to first bring the box beneath the clinching means, raise it in place, perform the clinching operation, lower the box and otherwise manipulate it to clinch the other sides of the boxes and heads, such operation being rather awkward, and involving considerable loss of time and requiring an unnecessary disturbance of the contents. In the present form of the invention the boxes are headed while standing on end with the flanged heads inserted in the top end of the box the same being moved to the clinching means with the top of the box projecting above the points where the staples are to be placed. For the particular purpose of facilitating rapid handling of the box and for other reasons above stated, as well as those that may be obvious from the operation of the machine, the clinch blocks 139 are brought into a position within the flanges of the head and opposite the chucks disposed on the outside of the box, in which position, the stapling operation is performed. The clinch blocks may then be rapidly moved out of position without otherwise disturbing the box. For further stapling, as for example, for the purpose of stapling another side of the box, it is only necessary to merely turn the box about its axis and to present the second face thereof opposite the chucks.

In the operation of the drive and clinching means, the shaft receives a substantially vertical reciprocation from the crank 94 as the latter is rotated with the shaft 95, and is adapted to swing with the links 107 about the pivot of the pivot post 106 thereby withdrawing and forwardly moving the drive block 110, the links 107 and 117 acting as a toggle with one end stationarily connected with the pivot post 106 and the other end connected to the drive block 110 so as to reciprocate the same longitudinally of the chuck bolster. As the drive block 110 is also connected to the hanger links 143, it will be observed that when the parts are in the position shown in Fig. 7 and as the thrust shaft is then moved downwardly whereby the links 107 and 117 are brought into a straight line position, the drive block 110 moves forwardly and causes the hanger links 143 to force the hanger 138 to turn about the pivots 144 thereby causing the clinch block 139 to enter within the recessed head 158 of the carton 7 to place it adjacent to the inner face of the flange 159 of said head preparatory to receiving the points of the staple. During this operation the cross pin 142 first rapidly turns the hanger to the position aforesaid and then slides upwardly along the slots 141 thereby releasing and permitting the projection 156 of the latch to move upwardly under the influence of the spring 154 which acts to bring the latch into position for the engagement of the notch 153 with the end 155 of the lock bar 148, thereby locking the hanger from rearward turning movement at the time that the staple is being driven against the clinch block 139. The forward movement of the driver 110 also carries the driver 120 through the guideway 119 of the chuck 98 with the forward end of said driver bearing against the head of a staple horizontally disposed upon the shoulders 133 of said guide-way with the points thereof directed towards the carton 7 and the clinch block 139. The lower forward corner 129 of the driver also engages with the inclined surface of the supporter block 123 and gradually cams it downwardly against the pressure of the spring 125, the supporter acting to maintain the position of the legs of the staple the original distance apart during the driving action.

Upon the upward movement of the thrust rods 93 and the thrust shaft 108 the drive block 110 is caused to move rearwardly to withdraw the driver 120 through the chuck 98 and to also withdraw the hanger links so as to cause the cross pin 142 to slide down the slots 141 into engagement with the projection 156 on the latch member 152, and, upon further movement, to withdraw said latch 152 from engagement with the end 155 of the lock bar 148. This disengagement is completed before the cross pin 142 reaches the bottom of the slots 141 so that as the pin engages the bottom of said slots, further rearward movement of the driver block 110 causes a rapid return of the hanger 138 from the position shown in Fig. 8 to that shown in Fig. 7 thereby clearing the end of the carton 7.

In the manufacturing practice the cartons are usually received in flat form and are adapted to be opened into a rectangular shape with open ends and are thus in the form ready to receive the recessed heads 158 and 160. For the purpose of applying the first head, the body of the carton is usually slipped over a shell 161 secured to a truck and projecting upwardly to a distance sufficient to support the recessed head 160 the proper distance within the end of the carton, as shown in Fig. 3, and the flanges of the recessed head are stapled to the sides of the carton by the means and in the manner above described. In the form of machine shown, six staples are driven simultaneously through the side of a carton and the flange of its head. After such operation, the hangers are raised as described above and the truck turned around so as to present the second side of the carton to the chucks for clinching said side and the corresponding flange of the head and so forth for the rest of the sides of said carton. With one head so secured to the carton body, the same is placed upon another truck and the carton is filled with a commodity, such as canned goods 162, as shown in dotted lines in Fig.

4. The carton usually chosen is of such a size that when the cans fill the carton the top surface of the same will be of such a height that when the recessed head 158 rests upon the same, it will be at the proper position relative to the carton walls to be stapled. The carton is then moved with a side thereof adjacent to a set of chucks (see Fig. 4) and the hangers lowered within the recessed head to press the flanges 159 against the side wall of the carton and the riveting operation performed in the manner above described.

Power transmitting mechanism.

The power for driving the machine is derived from a motor 14 supported upon a shelf 13 and is suitably geared through the pinion 165 to a gear 166 mounted upon a shaft 167 supported in the bearing members 168. Adjacent to the gear 166 upon the shaft 167 is also provided a loose pinion 169 provided with a clutch hub 170 adapted to cooperate with the clutch member 171 secured to the gear 166. The loose pinion 169 meshes with a gear 97 secured to the shaft 95 to which the crank 94 is also secured. The shaft 167 is also provided with a pinion 173 which drives the gear 174 secured to a jack shaft 175 which projects beyond one side of the machine. The projecting end of this shaft carries another gear 176 in mesh with the gear 177 secured to the brush shaft upon the respective ends of which are also secured the cranks 48 and 25 for operating the separating hooks 42 and the hopper 15.

In the operation of the transmitting mechanism, the motor operates to continually drive the train of gears to the brush shaft whereby the hopper and the separating hooks operate continuously but the driving of staples is controlled by the clutch and a treadle mechanism comprising a foot treadle 178 and connecting rod 179 suitably secured to the clutch hub 169 so that when a carton is to be stapled the operator depresses the treadle 178 and causes the clutch members to engage whereby the motor drives the train gears to the shaft 95. The rotation of this shaft causes upward and downward movement of the thrust rods 93 which in turn causes the functioning of the drive and clenching means and at the same time, through the pawl and ratchet mechanisms secured to the thrust rods, to cause intermittent rotation of the feed wheels 60 hereinbefore described.

General operation.

For the general operation, staples of the size chosen are placed within the hopper and the hopper is caused to reciprocate from the brush shaft and the connections therebetween so as to cause the staples to periodically move towards the angularly reciprocated separating hooks which are continually operating to select and raise staples to the bridges where the staples are placed. The rotating brushes engage the staples upon said bridge and force the same towards the feed wheels. Upon each operation of the thrust rods, the feed wheels will be made to turn to successively carry staples to the raceways permitting the staples to slide therethrough to the respective chucks. The same operation of the thrust rods will operate to move the drive blocks and drivers forward thereby forcing the staples toward and through the material to be operated upon and at the same time rapidly swinging the clinching block into place, as well as locking the same into place, to receive and clinch the ends of the staples as the drivers force the same through the material.

Modified hopper.

In Figs. 9, 10 and 11 I have shown the machine equipped with a hopper of the jolter type. This hopper extends for nearly the full width of the machine and is composed of two parts or sections 180 and 181, the former is in the lower position and is supported upon a pair of straps 182 secured to the bottom 180' of the section 180, as by bolts 182', the straps being suitably supported upon the transverse shaft 183. This shaft has its ends supported in the brackets 184 suitably secured to the rear of the side frames 10 and 11. The section 180 is also supported at its lower end upon a horizontal transverse rest-bar 185, also suitably secured to the rear of the side frames 10 and 11, as by screws 185'. The shaft 183 is also secured in fixed position with relation to the brackets 184 by set screws 183'. The hopper section 181, however, is supported to rotate freely about the shaft 183 and has secured to the bottom thereof straps 186 secured thereto by bolts 186' and bearing freely upon shaft 183. The sections 180 and 181 are each open at an end thereof with the open end of the section 181 adapted to telescope within the open end of the section 180. The section 181 is provided at the sides thereof with link straps 187 pivotally connected to the side walls of said section by means of pivot pins 188. The position of each of these link straps may be angularly adjusted and secured into adjusted position by means of an adjusting thumb bolt 189, passing through an arcuate slot 188' provided in each side wall of the section 181. To the free ends of the link straps are suitably secured coiled springs 190 at the lower ends thereof, the other ends of these springs being secured to jolter hangers 191 freely suspended from the pivot 192 fixed upon the frame of the machine. The jolter hangers are also secured to the lower ends of springs 193, the other ends of which are secured to fixed parts of the machine.

At the rear of the side frames and near the upper portion thereof are provided brackets 194 within which is supported a horizontal transverse shaft 195 provided at the ends thereof with the jolter members 196 and 197, the shaft being freely rotatable within said brackets. The jolter 197 is provided with a rearward projection or arm 198 pivotally connected to a link 199, which in turn is pivotally connected to the crank 50 secured to the end of the brush shaft 26. The other end of the shaft 195 merely carries the jolter member 196. Both of the jolter members 196 and 197 are provided with pins 200 which are adapted to engage with the tapered ends 201 of the jolter hangers 191.

In operation the continual operation of the brush shaft 26 and the crank 48 attached thereto imparts angular reciprocating motion to the arm 198 and the shaft 195. Accordingly the jolter members 196 and 197 are caused to alternately contact with the opposite edges of the tapered ends 201 of the jolter hangers 191 and, in the upward direction of said jolter members, will raise said hangers to thereby place the springs 190 under tension and raising the rocking pan or hopper section 181 above its normal position. As the pins 200 slip off of the tapered ends 201, the pan is then free to fall by gravity and as it is brought to a stop at the stretch limit of the spring, the pan or section 181 is caused to vibrate vertically, more or less, so as to agitate and cause the movement of staples, deposited therein, into the fixed pan or section 180.

The return movement of the jolter members 196 and 197 carries the pins 200 against the upper edges of the tapered ends 201, thereby causing a tensioning of the springs 193 and when said pins are released from the jolter hangers, the contraction of said springs 193 will suddenly cause another vibration of the hopper section 181 and a similar consequent feeding of a few more staples to the fixed section 180. In this way a continual and sufficient supply of staples is delivered to the hooks 42 which operate in the fixed section 180 in exactly the same way as said hooks operate in the preferred form of hopper mechanism, described above, to separate certain staples that engage therewith and to raise the same to the bridges.

While I have disclosed a preferred form of machine for carrying out my invention, and a modified form of the hopper means that may be utilized therein, I wish it to be understood however, that my invention is not necessarily limited to the particular details described and shown but that such invention may comprehend any number of equivalent devices and details which may fall within the scope and the spirit of the appended claims.

Having thus described my invention what I claim and desire to secure by Letters Patent is:

1. In a stapling machine having driving and clinching means, the combination of means for holding staples, means for separating staples from said staple holding means, means for guiding the separated staples from said separating means to a feeding position, means for positively feeding said staples in succession, means for guiding the fed staples gravitationally from said feeding means to a driving position, means connected to said driving and clinching means movable in one direction to effect a driving and clinching of said staples and means connected between said movable means and said feeding means for actuating said feeding means upon the return movement of said movable means.

2. In a stapling machine, the combination of means for containing staples, means for separating staples from said staple containing means, means for positioning the separated staples in position for a feeding operation, means for positively and successively feeding the positioned staples, means for receiving and guiding the fed staples gravitationally to a driving position, staple driving means, means operable in one movement for actuating said staple driving means, means connected to and actuated by said staple driving means for clinching said staples during the driving operations, means connected to said staple driving actuating means and said feeding means for actuating said feeding means upon return movement of said staple driving actuating means.

3. In a stapling machine, the combination of means for storing staples, means for separating and positioning said staples, means for successively feeding said staples, means including a drive block for driving said fed staples and means located and actuated by said drive block for clinching said staples.

4. In a stapling machine comprising power transmitting means, the combination of a common staple holding means, a plurality of separating means adapted to simultaneously separate staples from said holding means and to position said staples, a plurality of intermittently actuated feeding devices for successively feeding multiples of said positioned staples, a plurality of driving devices including driving blocks for simultaneously driving said staples and a plurality of clinching devices operatively connected to said driving blocks to be actuated thereby for simultaneously clinching said staples during said driving operation.

5. In a stapling machine comprising means for supporting articles to be stapled and power transmission means, the combination of means for holding a quantity of staples, means actuated by said power transmission means for agitating said holding means, separating means for simultaneously separating staples from said holding means during said agitating operation, means for receiving said separated staples from said separating means, power actuated means for moving said staples along said receiving means, means intermittently and simultaneously actuated for transferring a multiple of staples from said receiving means to a plurality of guide means, means for guiding said staples in multiple to a plurality of driving means, power actuated means for driving said guided staples in multiple through said article to be stapled means connected to and actuated by the driving means for clinching said driven staples and means for controlling the operation of said transferring, driving and clinching means.

6. In a stapling machine comprising means for holding a quantity of staples, means for separating and feeding said staples and power transmission means, the combination of power actuated staple driving means including driving blocks, means for clinching said driven staples, means connected to said driving blocks and said clinching means and actuated by said driving blocks to position said clinching means in operative clinching relation with said driving means and means controlled by the movement of said driving blocks for locking said clinching means from movement during the driving and clinching operation.

7. In a stapling machine comprising means for holding a quantity of staples, means for separating and feeding said staples and power transmission means, the combination of power actuated staple driving means including driving blocks, means for clinching said driven staples, means connected to said driving blocks and said clinching means and actuated by said driving blocks to position said clinching means in operative clinching relation with said driving means, means controlled by the movement of said driving blocks for locking said clinching means from movement during the driving and clinching operation and means for maintaining the legs of the staples in parallel relation during said driving and clinching operation.

8. In a stapling machine adapted to operate upon boxes provided with flanged heads, the combination of means for driving staples through the walls of said boxes and the flanges of said heads, means for moving a clinch-block from a position clear of the heads to a position within said heads and adjacent to the flanges thereof, means for locking said clinch-block in position during the driving and clinching operation and means for releasing said locking means upon the reverse movement of said driving means.

9. In a stapling machine adapted to operate upon boxes provided with flanged heads, the combination of means for driving staples through the walls of said boxes and the flanges of said heads, means connected to and actuated by said driving means for moving a clinch-block within said heads and adjacent to the flanges thereof, means controlled by the movement of said driving means for locking said clinch-block in position during the driving and clinching operations, means on said locking means actuated by the reverse movement of said driving means for releasing said clinch-block, said clinch-block moving means adapted to move said clinch-block to clear the flanges of said heads and the ends of said boxes and means for maintaining the legs of the staples parallel during the driving and clinching operation.

10. In a driving and clinching device for fastening members, the combination of a stationary chuck device, power actuated driving means reciprocable in said chuck, movable clinch means mounted upon said chuck and adapted to be moved to and from a position opposite said driving means, means connected between said clinching means and said driving means and actuated by said driving means to position said clinching means in operative relation with said driving means and means mounted upon said chuck and controlled by the movement of said driving means for locking said clinching means from movement during the driving and clinching operations.

11. In a driving and clinching device for fastening members, the combination of a stationary member within which the fastening members are adapted to be placed, power actuated driving means reciprocable through said stationary member, clinching means movably mounted upon said stationary member and adapted to be moved from position opposite said driving member, means connecting said clinching member and said driving member, said clinching member adapted to be actuated by said driving member through said connecting means to move said clinching means into and out of operative clinching operation with said driving means, means connected to said clinching means and controlled by the movement of said driving means for locking said clinching means from movement during the driving and clinching operations, and means for guiding and supporting the fastening members during said driving and clinching operations.

In witness whereof, I have hereunto set my hand this 11th day of April, 1919.

HARRISON B. WALTER.